United States Patent
Joe et al.

(10) Patent No.: US 11,549,084 B2
(45) Date of Patent: Jan. 10, 2023

(54) CLEANING LIQUID COMPOSITION AND METHOD FOR CLEANING POLYMERIZATION APPARATUS USING SAME

(71) Applicant: LG Chem, Ltd., Seoul (KR)

(72) Inventors: Dae June Joe, Daejeon (KR); Won Mun Choi, Daejeon (KR); Eun Gyeong Lee, Daejeon (KR)

(73) Assignee: LG Chem, Ltd.

( * ) Notice: Subject to any disclaimer, the term of this patent is extended or adjusted under 35 U.S.C. 154(b) by 402 days.

(21) Appl. No.: 16/638,848

(22) PCT Filed: Aug. 29, 2018

(86) PCT No.: PCT/KR2018/009971
§ 371 (c)(1),
(2) Date: Feb. 13, 2020

(87) PCT Pub. No.: WO2019/088431
PCT Pub. Date: May 9, 2019

(65) Prior Publication Data
US 2020/0362273 A1 Nov. 19, 2020

(30) Foreign Application Priority Data

Oct. 31, 2017 (KR) .......... 10-2017-0143126
Aug. 28, 2018 (KR) .......... 10-2018-0101358

(51) Int. Cl.
*C11D 7/18* (2006.01)
*C11D 7/50* (2006.01)
(Continued)

(52) U.S. Cl.
CPC .............. *C11D 7/3281* (2013.01); *B08B 3/08* (2013.01); *B08B 9/032* (2013.01); *C11D 3/18* (2013.01);
(Continued)

(58) Field of Classification Search
CPC ........... C11D 3/18; C11D 1/181; C11D 1/187; C11D 3/3917; C11D 3/392; C11D 3/43
(Continued)

(56) References Cited

U.S. PATENT DOCUMENTS 5,312,940 A * 5/1994 Grubbs ................. C07F 15/002
556/136
5,342,909 A * 8/1994 Grubbs ............... C07F 15/0046
526/170

(Continued)

FOREIGN PATENT DOCUMENTS

JP H11510807 A 9/1999
JP 2003176294 A 6/2003
(Continued)

OTHER PUBLICATIONS

International Search Report for Application No. PCT/KR2018/009971 dated Jan. 17, 2019, 2 pages.

*Primary Examiner* — Gregory R Delcotto
(74) *Attorney, Agent, or Firm* — Lerner, David, Littenberg, Krumholz & Mentlik, LLP

(57) ABSTRACT

A cleaning liquid composition is provided. More particularly, a cleaning liquid composition includes a transition metal compound represented by Chemical Formula 1 (see the detailed description of the present invention); and a hydrocarbon-based solvent, and a cleaning method of a polymerization apparatus using the same.

12 Claims, 1 Drawing Sheet

(51) Int. Cl.
 *C11D 7/54* (2006.01)
 *C11D 7/32* (2006.01)
 *B08B 3/08* (2006.01)
 *B08B 9/032* (2006.01)
 *C11D 7/24* (2006.01)
 *C11D 11/00* (2006.01)
 *C11D 3/39* (2006.01)
 *C11D 3/43* (2006.01)
 *C11D 3/18* (2006.01)

(52) U.S. Cl.
 CPC ............ *C11D 3/392* (2013.01); *C11D 3/3917* (2013.01); *C11D 3/43* (2013.01); *C11D 7/244* (2013.01); *C11D 7/5027* (2013.01); *C11D 11/0041* (2013.01); *B08B 2220/04* (2013.01)

(58) Field of Classification Search
 USPC .................... 510/213, 238, 500, 505, 376
 See application file for complete search history.

(56) References Cited

U.S. PATENT DOCUMENTS

| | | | | |
|---|---|---|---|---|
| 5,831,108 A * | 11/1998 | Grubbs | ................. | C08G 61/08 556/136 |
| 5,969,170 A * | 10/1999 | Grubbs | ................. | C07C 51/353 556/136 |
| 6,111,121 A * | 8/2000 | Grubbs | ................. | B01J 31/2265 556/136 |
| 6,211,391 B1 * | 4/2001 | Grubbs | ................. | B01J 31/2265 556/136 |
| 6,624,265 B2 * | 9/2003 | Grubbs | ................. | C07F 15/0046 526/170 |
| 6,696,597 B2 * | 2/2004 | Pederson | ................. | C07F 5/025 560/231 |
| 2001/0039360 A1 | 11/2001 | Grubbs et al. | | |
| 2003/0069374 A1 | 4/2003 | Grubbs et al. | | |
| 2003/0181609 A1 * | 9/2003 | Grubbs | ................. | C08F 4/80 556/136 |
| 2003/0236421 A1 * | 12/2003 | Nakamura | ................. | C07D 409/14 548/364.4 |
| 2004/0097745 A9 * | 5/2004 | Grubbs | ................. | C07C 201/12 558/207 |
| 2005/0026797 A1 | 2/2005 | Pawlow et al. | | |
| 2009/0054597 A1 | 2/2009 | Ong et al. | | |
| 2012/0149840 A1 | 6/2012 | Muller et al. | | |
| 2012/0323037 A1 | 12/2012 | Pilard et al. | | |
| 2013/0029069 A1 | 1/2013 | Soddemann et al. | | |
| 2013/0225462 A1 | 8/2013 | Di Biase et al. | | |

FOREIGN PATENT DOCUMENTS

| | | |
|---|---|---|
| JP | 2007500766 A | 1/2007 |
| JP | 2009046681 A | 3/2009 |
| KR | 20120061946 A | 6/2012 |
| KR | 20130129181 A | 11/2013 |

* cited by examiner

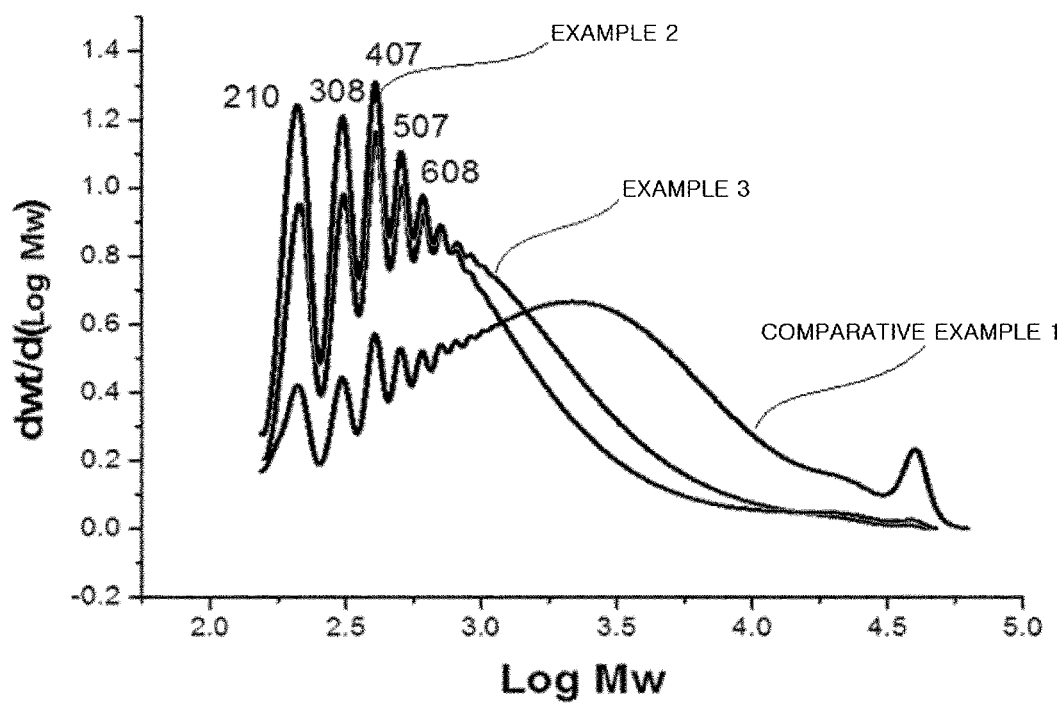

CLEANING LIQUID COMPOSITION AND METHOD FOR CLEANING POLYMERIZATION APPARATUS USING SAME

CROSS-REFERENCE TO RELATED APPLICATIONS

The present application is a national stage entry under U.S.C. § 371 of International Application No. PCT/KR2018/009971 filed on Aug. 29, 2018, which claims priority under 35 U.S.C. § 119 to Korean Patent Application No. 10-2017-0143126 filed on Oct. 31, 2017, and Korean Patent Application No. 10-2018-0101358 filed on Aug. 28, 2018, in the Korean Intellectual Property Office, the disclosures of which are incorporated herein by reference in their entirety.

TECHNICAL FIELD

The present invention relates to a cleaning liquid composition, and more particularly, to a cleaning liquid composition and a cleaning method of a polymerization apparatus using the same.

BACKGROUND ART

A solution polymerization method which facilitates preparation of a high molecular weight polymer is mainly used to polymerize the high molecular weight polymer from a monomer including diene. For example, the high molecular weight polymer such as solution styrene butadiene rubber (SSBR), butadiene rubber (BR), styrene butadiene styrene block copolymer (SBS), or the like, is polymerized by the solution polymerization method.

However, when the high molecular weight polymer is polymerized using the solution polymerization method, the high molecular weight polymer is accumulated in a polymerization reactor, thus causing problems in that heat exchange efficiency in the polymerization reactor is lowered, productivity is lowered due to volume reduction inside the polymerization reactor due to the accumulated high molecular weight polymer, and the accumulated polymer flows into a lower end of the polymerization reactor to block transfer of reaction products.

Accordingly, in order to solve the above-described problems, jet-cleaning in which the high molecular weight polymer accumulated with high pressure water is physically removed by directly supplying manpower into the reactor periodically is performed. However, the removal time is required for 5 days on average during the jet-cleaning, and thus operation of production equipment including the corresponding polymerization reactor is stopped during the corresponding time, which has a bad impact on productivity. Further, there is always a possibility of a safety accident since the manpower is supplied directly into the polymerization reactor, and there is a problem in that water is used in the jet-cleaning, and thus a process for removing water, or the like, is additionally required to resume the solution polymerization, in particular, anionic polymerization after the cleaning is completed.

Therefore, as a method for removing the high molecular weight polymer accumulated in the polymerization reactor, a cleaning method capable of securing both productivity and safety has been demanded instead of a physical manner such as jet-cleaning. Accordingly, the present invention suggests a chemical method utilizing a catalyst capable of removing a rubber that is accumulated.

DISCLOSURE

Technical Problem

An object of the present invention is to provide a cleaning method of a polymerization apparatus using a cleaning liquid composition in which a high molecular weight polymer accumulated in a polymerization reactor is removed in a chemical manner using a cleaning liquid composition rather than in a physical manner.

That is, the present invention has been made to solve the above-described problems of the related art, adding the cleaning liquid composition for cleaning polymerization apparatus at polymerization reactor, a high molecular weight polymer accumulated in polymerization apparatus is decomposed and removed in a chemical manner, and has an object of securing safety against direct supply with manpower, and to secure productivity by reducing cleaning time of the polymerization apparatus.

Technical Solution

In one general aspect, a cleaning liquid composition includes: a transition metal compound represented by Chemical Formula 1 below; and a hydrocarbon-based solvent:

[Chemical Formula 1]

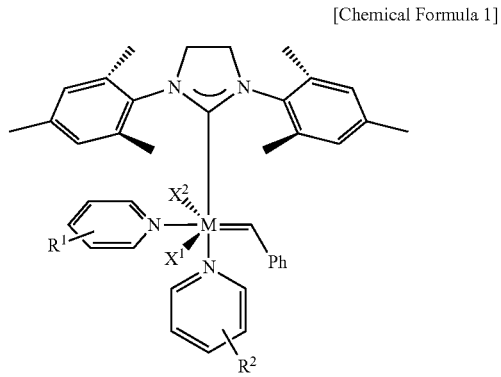

in Chemical Formula 1, M may be ruthenium or osmium, $R^1$ and $R^2$ may be each independently a hydrogen atom or a substituent represented by Chemical Formula 2 below, at least one of $R^1$ and $R^2$ may be a substituent represented by Chemical Formula 2 below, $X^1$ and $X^2$ may be each independently a halogen atom, and Ph may be a phenyl group, and

[Chemical Formula 2]

in Chemical Formula 2, $R^3$ and $R^4$ may be each independently a C1-C10 alkyl group; or $R^3$ and $R^4$ may be linked with each other to form a saturated or unsaturated 5-membered ring.

In another general aspect, a cleaning method of a polymerization apparatus includes: swelling a diene-based polymer in a polymerization apparatus with a hydrocarbon-based solvent (S10); and adding and stirring the cleaning liquid composition described above and a vinyl-based monomer in the presence of the diene-based polymer swollen in step (S10), thereby oligomerizing the diene-based polymer (S20).

Advantageous Effects

When the polymerization apparatus is cleaned using the cleaning liquid composition according to the present invention, the high molecular weight polymer accumulated in the polymerization apparatus may be removed in a chemical manner, and thus it is possible to perform cleaning within a short period of time without causing a problem of safety due to direct supply with manpower, thereby shortening re-operation time of the polymerization reactor to improve productivity.

DESCRIPTION OF DRAWINGS

The FIGURE is a graph showing weight average molecular weights obtained by decomposing and filtering rubbers using respective cleaning liquid compositions prepared in Examples 2 and 3 and Comparative Example 1 of the present invention, and then measuring oligomers remaining in a solution by gel permeation chromatography.

BEST MODE

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in the best mode.

Hereinafter, the present disclosure will be described in more detail to assist in understanding the technical idea of the present invention.

According to the present invention, a cleaning liquid composition for solving the above-described problems is provided. According to an embodiment of the present invention, the cleaning liquid composition may include a transition metal compound represented by Chemical Formula 1 below; and a hydrocarbon-based solvent:

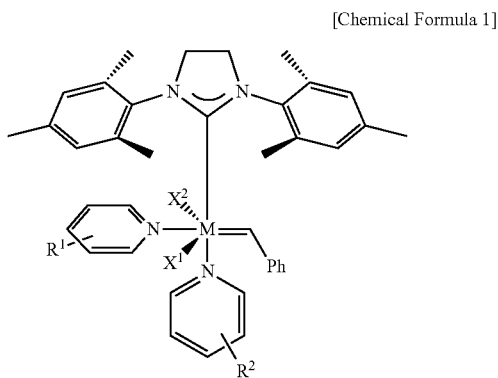

[Chemical Formula 1]

in Chemical Formula 1, M may be ruthenium or osmium, $R^1$ and $R^2$ may be each independently a hydrogen atom or a substituent represented by Chemical Formula 2 below, at least one of $R^1$ and $R^2$ may be a substituent represented by Chemical Formula 2 below, $X^1$ and $X^2$ may be each independently a halogen atom, and Ph may be a phenyl group,

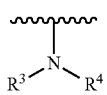

[Chemical Formula 2]

in Chemical Formula 2, $R^3$ and $R^4$ may be each independently a C1-C10 alkyl group; or $R^3$ and $R^4$ may be linked with each other to form a saturated or unsaturated 5-membered ring.

The transition metal compound represented by Chemical Formula 1 included in the cleaning liquid composition according to an embodiment of the present invention may be a transition metal compound for decomposing a high molecular weight polymer accumulated in the polymerization apparatus. As a specific example, the transition metal compound may be a catalyst for decomposing the high molecular weight polymer into an oligomer having a low molecular weight by performing olefin cross metathesis in which a carbon-carbon double bond among repeating units present in the high molecular weight polymer accumulated in the polymerization apparatus is decomposed and recombined. That is, the cleaning liquid composition according to an embodiment of the present invention may be a cleaning liquid catalyst composition. When the transition metal compound represented by Chemical Formula 1 above is used as the catalyst for decomposition of a polymer, chemical stability is excellent, and there is small effect on other functional groups and substituents except for carbon-carbon double bonds among the repeating units present in the polymer, thereby achieving excellent cleaning efficiency when the polymerization apparatus is cleaned, and it is possible to perform stable cleaning.

In the present invention, the term "atom" included in the compound, such as a hydrogen atom, a halogen atom, or the like, may mean the atom itself or may mean a radical forming a covalent bond or a ligand forming a coordination bond. In other words, according to an embodiment of the present invention, the hydrogen atom may mean a hydrogen radical, and the halogen atom may mean a halogen ligand. Here, the halogen atom may mean one kind halogen atom selected from the group consisting of F, Cl, Br and I.

The term "saturated or unsaturated 5-membered ring" in the present invention may mean a saturated or unsaturated ring group formed of five atoms including the N atom shown in Chemical Formula 2, wherein the saturated ring group may mean that there is no double bonding in the ring, and the unsaturated ring group may mean that there is one or more double bondings in the ring. Here, the saturated or unsaturated 5-membered ring may mean that all the atoms forming the 5-membered ring are carbon atoms except for the nitrogen (N) atom shown in Chemical Formula 2 or may further include one or more kinds of hetero atoms selected from the group consisting of oxygen (O), nitrogen (N), and sulfur (S) in addition to the carbon atoms. Further, the saturated or unsaturated 5-membered ring may be substituted or unsubstituted with a substituent such as a monovalent hydrocarbon group, a monovalent hydrocarbon group including a hetero atom, or the like.

According to an embodiment of the present invention, as a specific example of the transition metal compound represented by Chemical Formula 1, in Chemical Formula 1 above, M may be ruthenium or osmium, $R^1$ and $R^2$ may be each independently the substituent represented by Chemical Formula 2, $X^1$ and $X^2$ may be Cl or Br, and in Chemical Formula 2, $R^3$ and $R^4$ may be each independently a C1-C5 alkyl group; or $R^3$ and $R^4$ may be linked with each other to form a saturated or unsaturated 5-membered ring. As a more specific example of the transition metal compound represented by Chemical Formula 1, in Chemical Formula 1, M may be ruthenium, $R^1$ and $R^2$ may be each independently the substituent represented by Chemical Formula 2, $X^1$ and $X^2$ may be Cl, and in Chemical Formula 2, $R^3$ and $R^4$ may be linked with each other to form a saturated or unsaturated 5-membered ring.

In addition, according to an embodiment of the present invention, the transition metal compound represented by Chemical Formula 1 may be a transition metal compound represented by Chemical Formula 3 below:

[Chemical Formula 3]

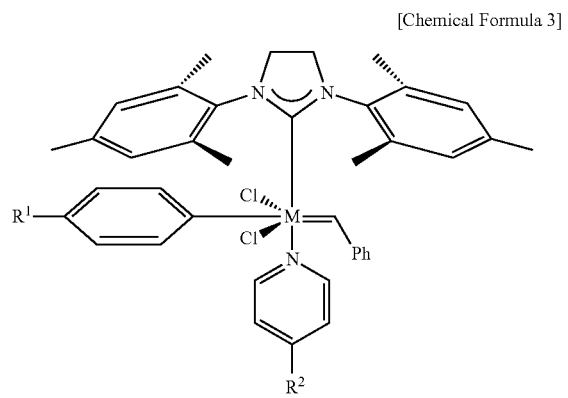

in Chemical Formula 3, M may be ruthenium or osmium, $R^1$ and $R^2$ may be each independently a hydrogen atom or a substituent represented by Chemical Formula 2 below, at least one of $R^1$ and $R^2$ may be a substituent represented by Chemical Formula 2 below, and Ph may be a phenyl group,

[Chemical Formula 2]

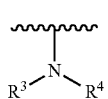

in Chemical Formula 2, $R^3$ and $R^4$ may be each independently a C1-C10 alkyl group; or $R^3$ and $R^4$ may be linked with each other to form a saturated or unsaturated 5-membered ring.

In addition, as a specific example of the transition metal compound represented by Chemical Formula 3, in Chemical Formula 3 above, M may be ruthenium or osmium, $R^1$ and $R^2$ may be each independently the substituent represented by Chemical Formula 2 above, $X^1$ and $X^2$ may be Cl or Br, and in Chemical Formula 2, $R^3$ and $R^4$ may be each independently a C1-C5 alkyl group; or $R^3$ and $R^4$ may be linked with each other to form a saturated or unsaturated 5-membered ring. As a more specific example of the transition metal compound represented by Chemical Formula 3, in Chemical Formula 3, M may be ruthenium, $R^1$ and $R^2$ may be each independently the substituent represented by Chemical Formula 2 above, $X^1$ and $X^2$ may be Cl, and in Chemical Formula 2, $R^3$ and $R^4$ may be linked with each other to form a saturated or unsaturated 5-membered ring. In this case, an efficiency of olefin cross metathesis is excellent, and thus there are effects that it is possible to clean the polymerization apparatus even with a smaller amount of the cleaning liquid composition, to perform stable cleaning, and to reduce time for a pre-treatment step until the polymerization is resumed after the cleaning is completed.

As a more specific example, the transition metal compound represented by Chemical Formula 3 above may be a transition metal compound represented by Chemical Formulas 3-1 to 3-8 below:

[Chemical Formula 3-1]

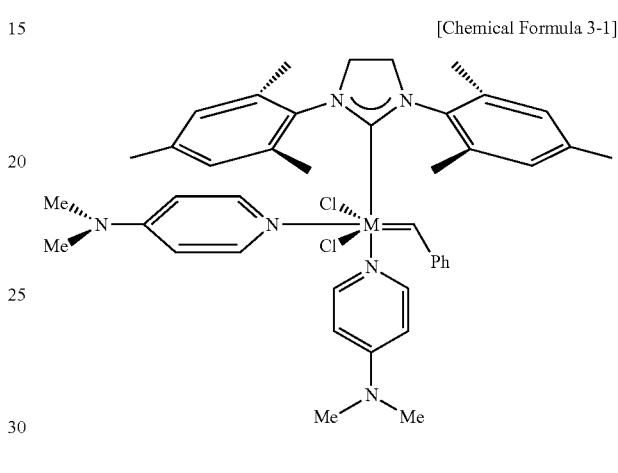

[Chemical Formula 3-2]

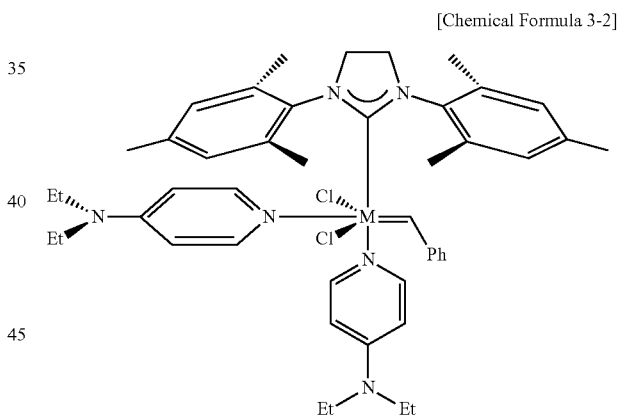

[Chemical Formula 3-3]

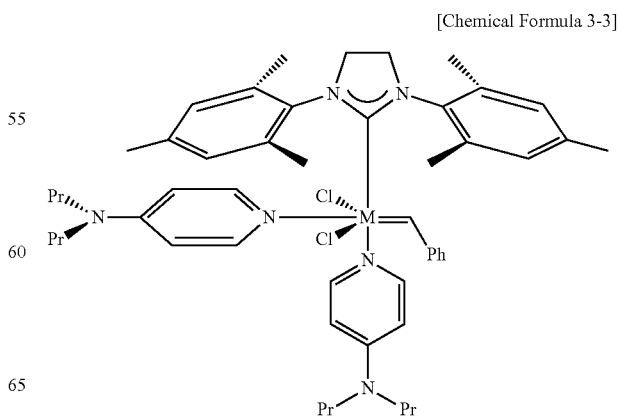

[Chemical Formula 3-4]

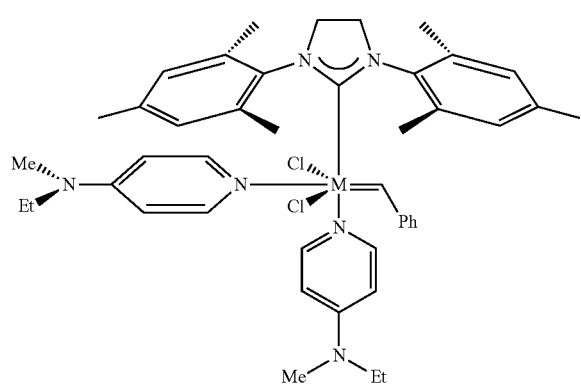

[Chemical Formula 3-5]

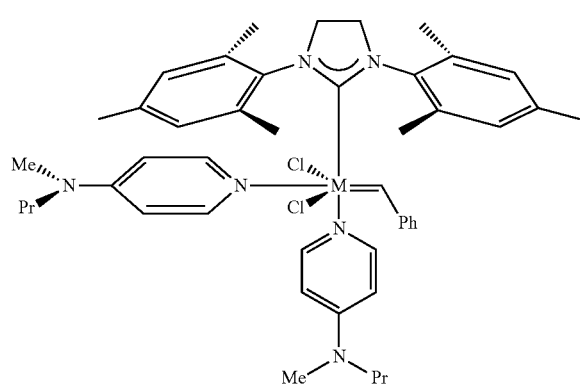

[Chemical Formula 3-6]

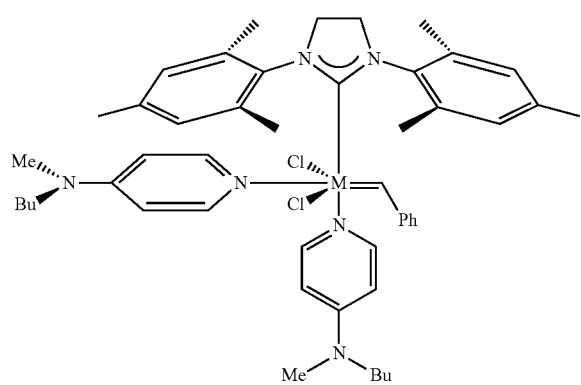

[Chemical Formula 3-7]

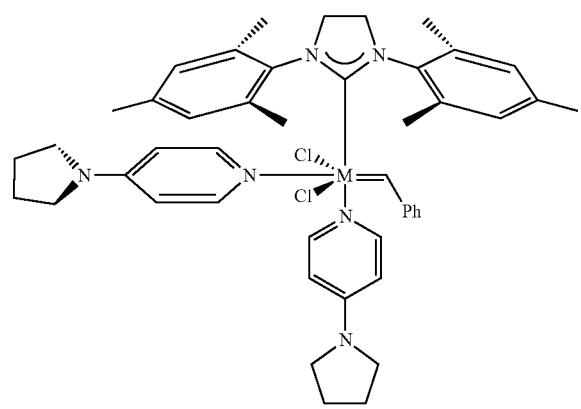

[Chemical Formula 3-8]

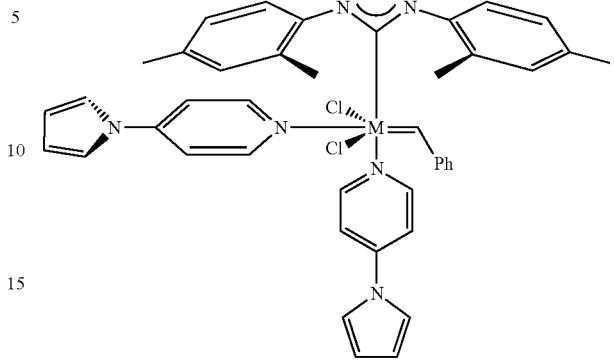

in Chemical Formulas 3-1 to 3-8, M is ruthenium, Ph is a phenyl group, Me is a methyl group, Et is an ethyl group, Pr is a propyl group, and Bu is a butyl group.

Meanwhile, in the substituent represented by Chemical Formula 2, which is a substituent of the transition metal compound represented by Chemical Formula 1 or 3 according to an embodiment of the present invention, $R^3$ and $R^4$ may be each independently a C1-C10 alkyl group; or $R^3$ and $R^4$ may be linked with each other to form a saturated or unsaturated 5-membered ring. In this case, an electron density to a nitrogen atom of an amino group or a nitrogen atom of the saturated or unsaturated 5-membered ring may be changed to control an electron density of the central metal, and thus there is an effect of controlling a cleaning ability of the polymerization apparatus.

According to an embodiment of the present invention, the cleaning liquid composition may include two or more kinds of the transition metal compounds represented by Chemical Formula 1 above. In this case, reactivity of the metathesis reaction is improved by a combination of two or more kinds of the compounds. Specifically, when two kinds of the transition metal compounds represented by Chemical Formula 1 above are included, one transition metal compound is able to allow a polymer having a weight average molecular weight in millions of units to be subjected to metathesis into hundreds of thousands of units, and the other transition metal compound is able to allow the polymer having a weight average molecular weight in hundreds of thousands of units to be subjected to metathesis into thousands of units, and thus reactivity of the metathesis reaction is improved.

Further, the cleaning liquid composition according to an embodiment of the present invention may be a composition in the form of a solution present in a state in which the above-described transition metal compound is dissolved in a hydrocarbon-based solvent. Here, the hydrocarbon-based solvent may be a hydrocarbon-based solvent commonly used in a solution polymerization. Specifically, the hydrocarbon-based solvent may be an aromatic hydrocarbon solvent, and more specifically, one or more kinds of solvents selected from the group consisting of benzene, toluene, ethylbenzene, xylene, and the like. In this case, it is easy to dissolve or disperse the transition metal compound, and it is possible to provide the same properties as the hydrocarbon-based solvent used in the solution polymerization, thereby minimizing the effect on solution polymerization even if some solvent remains in the polymerization apparatus after cleaning.

According to an embodiment of the present invention, an amount of the transition metal compound represented by Chemical Formula 1 is 0.1% by weight to 10% by weight, 0.1% by weight to 5% by weight, or 0.1% by weight to 1% by weight based on the total amount of the cleaning liquid composition. Within this range, the efficiency of the olefin cross metathesis is excellent, and thus it is possible to clean the polymerization apparatus even with a smaller amount of the cleaning liquid composition, to perform stable cleaning, and to reduce time for a pre-treatment step until the polymerization is resumed after the cleaning is completed.

Meanwhile, according to an embodiment of the present invention, there is provided a preparation method for preparing the cleaning liquid composition. The preparation method of the cleaning liquid composition may include adding and stirring compounds represented by Chemical Formulas 4 and 5 below in a first hydrocarbon-based solvent (S1); during the stirring in step (S1), adding and stirring a transition metal compound represented by Chemical Formula 6 below (S2); after the stirring of step (S2) is completed, adding a second hydrocarbon-based solvent (S3); filtering a precipitate according to step (S3) to obtain a transition metal compound represented by Chemical Formula 1 below (S4); and adding the transition metal compound obtained in step (S4) into a third hydrocarbon-based solvent (S5):

[Chemical Formula 4]

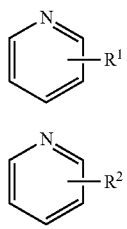

[Chemical Formula 5]

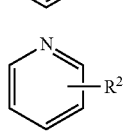

in Chemical Formulas 4 and 5, $R^1$ and $R^2$ may be each independently a hydrogen atom or a substituent represented by Chemical Formula 2 below, at least one of $R^1$ and $R^2$ may be a substituent represented by Chemical Formula 2 below,

[Chemical Formula 2]

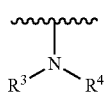

in Chemical Formula 2, $R^3$ and $R^4$ may be each independently a C1-C10 alkyl group; or $R^3$ and $R^4$ may be linked with each other to form a saturated or unsaturated 5-membered ring,

[Chemical Formula 6]

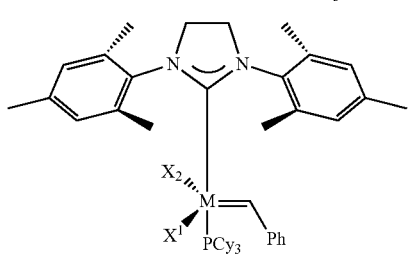

in Chemical Formula 6, M may be ruthenium or osmium, $X^1$ and $X^2$ may be each independently a halogen atom, Ph may be a phenyl group, and Cy may be a C5-C10 aliphatic or aromatic hydrocarbon ring group,

[Chemical Formula 1]

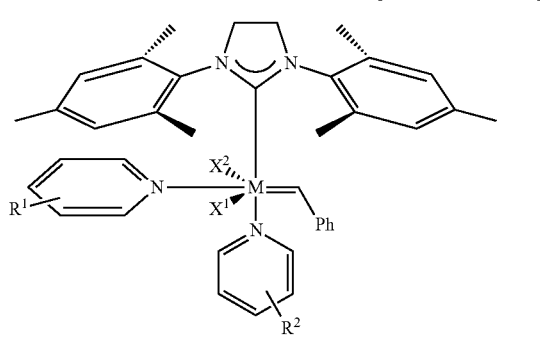

in Chemical Formula 1, M may be ruthenium or osmium, $R^1$ and $R^2$ may be each independently a hydrogen atom or a substituent represented by Chemical Formula 2 below, at least one of $R^1$ and $R^2$ may be a substituent represented by Chemical Formula 2 below, $X^1$ and $X^2$ may be each independently a halogen atom, and Ph may be a phenyl group,

[Chemical Formula 2]

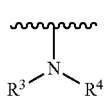

in Chemical Formula 2, $R^3$ and $R^4$ may be each independently a C1-C10 alkyl group; or $R^3$ and $R^4$ may be linked with each other to form a saturated or unsaturated 5-membered ring.

According to an embodiment of the present invention, the substituent of each compound described in the preparation method of the cleaning liquid composition may be the same substituent as the substituent of each compound described in the cleaning liquid composition.

According to an embodiment of the present invention, the first hydrocarbon-based solvent may be an aromatic hydrocarbon solvent, the second hydrocarbon-based solvent may be an aliphatic hydrocarbon solvent, and the third hydrocarbon-based solvent may be a hydrocarbon-based solvent commonly used in the solution polymerization, and specifically, may be an aromatic hydrocarbon solvent, and more specifically, may be one or more kinds of solvents selected from the group consisting of benzene, toluene, ethylbenzene, xylene, and the like.

According to an embodiment of the present invention, the cleaning liquid composition may include a vinyl-based monomer.

As a specific example, the vinyl-based monomer may be one or more kinds selected from the group consisting of a C2-C10 olefin monomer, a conjugated diene-based monomer, and an aromatic vinyl-based monomer. As specific examples, the C2-C10 olefin monomer may be one or more kinds selected from the group consisting of mono-substituted alkenes such as ethene, propene, butene, pentene, hexene, heptene, octene, nonene, and decene, the conjugated diene-based monomer may be one or more kinds selected from the group consisting of 1,3-butadiene, 2,3-dimethyl-1, 3-butadiene, piperylene, 3-butyl-1,3-octadiene, isoprene, 2-phenyl-1,3-butadiene, and 2-halo-1,3-butadiene (wherein halo means a halogen atom), and the aromatic vinyl-based monomer may be one or more kinds selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

According to an embodiment of the present invention, the vinyl-based monomer may include two or more kinds of vinyl-based monomers. In this case, reactivity of the metathesis reaction is improved due to a difference in reactivity between two or more kinds of the vinyl-based monomers.

As described above, when the cleaning liquid composition is prepared according to the present invention, it is possible to prepare the cleaning liquid composition according to the present invention with high yield.

Further, according to the present invention, there is provided a cleaning method of a polymerization apparatus which is capable of cleaning a polymerization apparatus using the cleaning liquid composition described above. According to an embodiment of the present invention, the cleaning method of a polymerization apparatus may include: swelling a diene-based polymer in a polymerization apparatus with a hydrocarbon-based solvent (S10); and adding and stirring the cleaning liquid composition described above and a vinyl-based polymer in the presence of the diene-based polymer swollen in step (S10), thereby oligomerizing the diene-based polymer (S20). When the polymerization apparatus is cleaned using the cleaning method of a polymerization apparatus described above, the high molecular weight polymer accumulated in the polymerization apparatus may be removed in a chemical manner, and thus it is possible to perform cleaning within a short period of time without causing a problem of safety due to direct supply with manpower, thereby shortening re-operation time of the polymerization reactor to improve productivity.

According to an embodiment of the present invention, the diene-based polymer accumulated in the polymerization apparatus may be a polymer or copolymer containing repeating units derived from a diene-based monomer. As a specific example, the diene-based polymer may be one kind selected from the group consisting of butadiene rubber, isoprene rubber, styrene-butadiene rubber, and a styrene-butadiene-styrene block copolymer.

Meanwhile, the swelling in step (S10) may be a step for swelling the diene-based polymer with the hydrocarbon-based solvent, the diene-based polymer being accumulated in the polymerization apparatus, i.e., being fixed in the polymerization apparatus including a wall surface, a stirrer, or the like, of the polymerization apparatus, thereby improving accessibility of the transition metal compound in the cleaning liquid composition. According to an embodiment of the present invention, the swelling of step (S10) may be performed at a temperature of 50° C. to 100° C., or 60° C. to 90° C., and within this range, the swelling of the diene-based polymer accumulated in the polymerization apparatus may be maximized.

According to an embodiment of the present invention, in order to oligomerize the swollen diene-based polymer after the diene-based polymer in the polymerization apparatus is swollen with the hydrocarbon-based solvent in step (S10), adding and stirring the cleaning liquid composition and the vinyl-based monomer (S20) may be performed. As described above, the cleaning liquid composition may serve as the catalyst for decomposing a high molecular weight polymer into an oligomer having a low molecular weight by performing the olefin cross metathesis in which the carbon-carbon double bond among repeating units present in the polymer with respect to the swollen diene-based polymer is decomposed and recombined.

Meanwhile, in order to perform oligomerization of the polymer through the olefin cross metathesis, it is required to add a separate compound including a carbon-carbon double bond represented by alkene, in addition to the carbon-carbon double bond present in the diene-based polymer. Accordingly, according to an embodiment of the present invention, as the compound including the carbon-carbon double bond, the vinyl-based monomer may be included and added to the cleaning solution composition.

As a specific example, the vinyl-based monomer may be, for example, one or more kinds selected from the group consisting of a C2-C10 olefin monomer, a conjugated diene-based monomer, and an aromatic vinyl-based monomer. As specific examples, the C2-C10 olefin monomer may be one or more kinds selected from the group consisting of monosubstituted alkenes such as ethene, propene, butene, pentene, hexene, heptene, octene, nonene, and decene, the conjugated diene-based monomer may be one or more kinds selected from the group consisting of 1,3-butadiene, 2,3-dimethyl-1, 3-butadiene, piperylene, 3-butyl-1,3-octadiene, isoprene, 2-phenyl-1,3-butadiene, and 2-halo-1,3-butadiene (wherein halo means a halogen atom), and the aromatic vinyl-based monomer may be one or more kinds selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

According to an embodiment of the present invention, in step (S20), two or more kinds of vinyl-based monomers may be added. In this case, reactivity of the metathesis reaction is improved due to a difference in reactivity between the two or more kinds of the vinyl-based monomers. Specifically, when two kinds of the vinyl-based monomers are added in the case where two kinds of the transition metal compounds represented by Chemical Formula 1 are included, one vinyl-based monomer improves an reactivity in an initial stage due to high metathesis efficiency of one transition metal compound between two transition metal compounds, and the other vinyl-based monomer improves reactivity in a middle stage and a last stage due to high reactivity with the other transition metal compound, and thus it is possible to improve overall reactivity of the metathesis reaction.

According to an embodiment of the present invention, the stirring of step (S20) may be performed for 1 hour to 24 hours, 3 hours to 24 hours, 3 hours to 6 hours, or 12 hours to 24 hours. Within this range, it is possible to maximize the efficiency of the cleaning liquid composition and to oligomerize the diene-based polymer without forming any residual or incidental sediments.

As a specific example, the stirring in step (S20) may be determined depending on the kind of the transition metal compound to be added, and when the transition metal compound having a high initial reaction rate is added, the stirring may be performed for 3 to 6 hours for rapid cleaning.

According to an embodiment of the present invention, the oligomers modified as above are dissolved and present in the hydrocarbon solution applied to the cleaning of the reactor, and are discharged together when the hydrocarbon solution is discharged from the polymerization apparatus.

Further, according to an embodiment of the present invention, in the cleaning liquid composition, the transition metal compound may be added in an equivalent amount of 0.001 mmol to 1 mmol, 0.01 mmol to 0.5 mmol, or 0.05 mmol to 0.3 mmol in the cleaning liquid composition per 100 g of the diene-based polymer accumulated in the polymerization apparatus. Within this range, the efficiency of olefin cross metathesis is excellent, and thus there are effects that it is possible to clean the polymerization apparatus even with a smaller amount of the cleaning liquid composition, to perform stable cleaning, and to reduce time for a pre-treatment step until the polymerization is resumed after the cleaning is completed.

Further, according to an embodiment of the present invention, in the cleaning liquid composition, the transition metal compound may be added in an equivalent amount of 1 mg to 100 mg, 10 mg to 100 mg, or 30 mg to 70 mg in the cleaning liquid composition per 100 g of the diene-based polymer accumulated in the polymerization apparatus. Within this range, the efficiency of olefin cross metathesis is excellent, and thus there are effects that it is possible to clean the polymerization apparatus even with a smaller amount of the cleaning liquid composition, to perform stable cleaning, and to reduce time for a pre-treatment step until the polymerization is resumed after the cleaning is completed.

Further, according to an embodiment of the present invention, the vinyl-based monomer may be added in an equivalent amount of 1 ml to 100 ml, 5 ml to 50 ml, or 5 ml to 30 ml per 100 g of the diene-based polymer accumulated in the polymerization apparatus. Within this range, there is an effect that the diene-based polymer is capable of being oligomerized into an oligomer having a smaller weight average molecular weight.

Meanwhile, according to an embodiment of the present invention, the diene-based polymer, that is, the diene-based polymer accumulated in the polymerization apparatus may have a weight average molecular weight of 30,000 g/mol to 100,000,000 g/mol, 50,000 g/mol to 80,000,000 g/mol, or 100,000 g/mol to 50,000,000 g/mol. The oligomerized diene-based oligomer by the cleaning method of a polymerization apparatus may have a weight average molecular weight of 100 g/mol to 10,000 g/mol, 100 g/mol to 8,000 g/mol, or 100 g/mol to 5,000 g/mol. Within this range, it is possible to remove a larger amount of the diene-based polymer, thereby achieving a high cleaning efficiency, and easy discharge together with the solvent in the polymerization apparatus after the cleaning is completed.

Meanwhile, according to an embodiment of the present invention, the oligomerized oligomer from step (S20) may be transferred to a separate separation apparatus and a separate distillation apparatus to separate the solvent and the oligomer, and then removed through a separation step and a stripping step.

Hereinafter, the following Examples of the present disclosure are described in more detail. It is obvious to those skilled in the art, however, that the following Examples are illustrative of the present invention and that various changes and modifications can be made within the scope and spirit of the invention, and thus the scope of the present invention is not limited thereto.

PREPARATION EXAMPLE

The following Preparation Examples 1 to 7 were synthesized in a nitrogen or argon gas atmosphere by a standard Schlenk technique using a glovebox filled with nitrogen with an oxygen concentration of less than 2 ppm. All solvents used such as toluene and n-hexane, and the like, were used in the form of an anhydrous solvent prepared by passing through a solvent purification column. When the reactant was a liquid, the reactant was purified using $CaH_2$. When the reactant was a solid, the reactant was dissolved in a solvent and then purified with $CaH_2$. After completion of the synthesis, a solid product obtained by precipitation and filtration was washed three times with an aliphatic hydrocarbon solvent and dried under reduced pressure to obtain a final product. $^1H$ NMR for the synthesized compound was measured by dissolving the synthesized compound in $CDCl_3$ using a Varian Mercury 500 at 499.85 MHz.

Preparation Example 1

In a 250 ml flask, 11.8 g of a compound represented by Chemical Formula 4-1 below was placed in 100 ml of toluene, and stirred for 1 hour. 20 g of the compound represented by Chemical Formula 6-1 was added to the stirred solution, and stirred at room temperature for 3 hours. After stirring, when the reaction solution in the flask was changed from red to pale green, n-hexane was added to precipitate a pale green compound. The precipitated compound was filtered and dried under reduced pressure to obtain a transition metal compound represented by Chemical Formula 3-1 below at a yield of 92% in which the compound represented by Chemical Formula 4-1 below was coordinated to ruthenium:

[Chemical Formula 4-1]

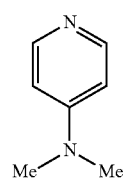

[Chemical Formula 6-1]

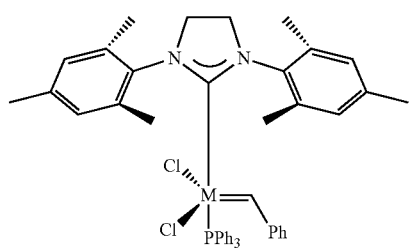

in Chemical Formula 6-1, M is ruthenium.

[Chemical Formula 3-1]

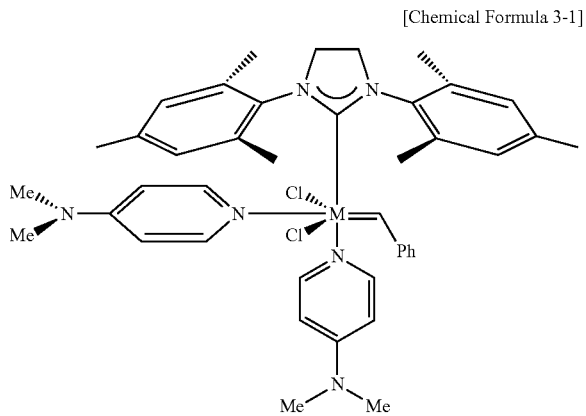

in Chemical Formula 3-1, M is ruthenium.

¹H NMR (CDCl₃, 500 MHz) δ 19.10 (s, 1H), 8.18 (d, 2H), 7.64 (d, 2H), 7.48 (t, 11H), 7.38 (d, 2H), 7.08 (t, 2H), 7.00 (broad s, 2H), 6.77 (broad s, 2H), 6.49 (d, 2H), 6.15 (d, 2H), 4.07 (broad d, 4H), 2.98 (s, 6H), 2.88 (s, 6H), 2.61-2.21 (18H).

Preparation Example 2

In a 250 ml flask, 14 g of a compound represented by Chemical Formula 4-7 below was placed in 100 ml of toluene, and stirred for 1 hour. 20 g of the compound represented by Chemical Formula 6-1 below was added to the stirred solution, and stirred at room temperature for 12 hours. After stirring, when the reaction solution in the flask was changed from red to pale green, n-hexane was added to precipitate a green compound. The precipitated compound was filtered and dried under reduced pressure to obtain a transition metal compound represented by Chemical Formula 3-7 below at a yield of 87% in which the compound represented by Chemical Formula 4-7 below was coordinated to ruthenium:

¹H NMR (CDCl₃, 500 MHz) δ 19.05 (s, 1H), 8.31 (d, 2H), 7.63 (d, 2H), 7.48 (t, 11H), 7.34 (d, 2H), 7.09 (t, 2H), 7.02 (broad s, 2H), 6.78 (broad s, 2H), 6.37 (d, 2H), 6.05 (d, 2H), 4.07 (broad d, 4H), 3.30 (m, 4H), 3.19 (m, 4H), 2.61-2.21 (18H), 2.02 (m, 4H), 1.94 (m, 4H).

Preparation Example 3

In a 250 ml flask, 14 g of a compound represented by Chemical Formula 4-8 below was placed in 100 ml of toluene, and stirred for 1 hour. 20 g of the compound represented by Chemical Formula 6-1 below was added to the stirred solution, and stirred at room temperature for 12 hours. After stirring, when the reaction solution in the flask changed from red to pale green, n-hexane was added to precipitate a green compound. The precipitated compound was filtered and dried under reduced pressure to obtain a transition metal compound represented by Chemical Formula 3-8 below at a yield of 80% in which the compound represented by Chemical Formula 4-8 below was coordinated to ruthenium:

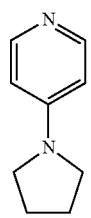

[Chemical Formula 4-7]

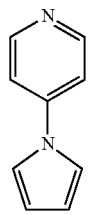

[Chemical Formula 4-8]

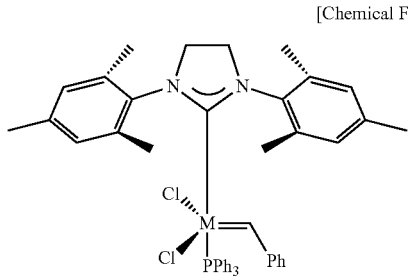

[Chemical Formula 6-1]

in Chemical Formula 6-1, M is ruthenium.

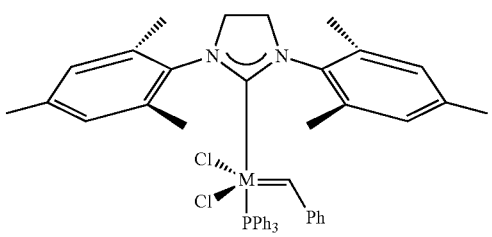

[Chemical Formula 6-1]

in Chemical Formula 6-1, M is ruthenium.

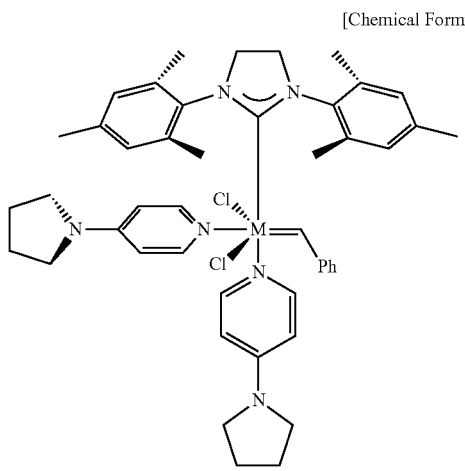

[Chemical Formula 3-7]

in Chemical Formula 3-7, M is ruthenium.

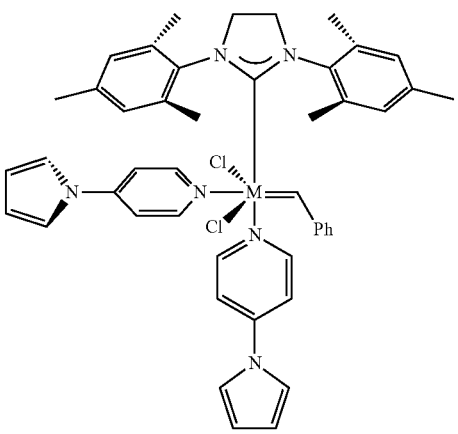

[Chemical Formula 3-8]

in Chemical Formula 3-8, M is ruthenium.

¹H NMR (CDCl₃, 500 MHz) δ 19.05 (s, 1H), 8.54 (d, 2H), 7.52 (d, 2H), 7.48 (t, 11H), 7.34 (d, 2H), 7.24 (d, 2H), 7.09

(t, 2H), 7.02 (broad s, 2H), 6.78 (broad s, 2H), 6.33~6.37 (dd, 4H), 6.05 (d, 2H), 4.07 (broad d, 4H), 2.61-2.21 (18H).

Preparation Example 4

In a nitrogen-filled glove box, 10 g of a compound represented by Chemical Formula 6-1 below and 1.16 g of CuCl were placed in a 500 ml round-bottom flask, and a magnetic bar was added thereto. The flask was sealed with a rubber septum and taken out of the glove box, and then 195 ml of purified $CH_2Cl_2$ was added using a syringe under nitrogen gas. A solution dissolved by adding 2.06 g of N,N'-dimethyl-1-(2-vinylphenyl)methanamine to a 20 ml vial, and sealing the vial with a silicon septum, then adding purified $CH_2Cl_2$ using a syringe under nitrogen gas was added to the mixture prepared above. After the addition, N,N'-dimethyl-1-(2-vinylphenyl)mathaneamine remaining in the vial was added entirely to the catalytic reaction vessel using 2×1 ml $CH_2Cl_2$. The 500 ml round-bottom flask reaction vessel was installed with a reflux cooler, a temperature was raised to 40° C., and the mixture was stirred under nitrogen gas for 3 hours. After the reaction, the temperature was lowered to room temperature, the magnetic bar was removed, and the solvent was removed by distillation under reduced pressure. The solvent was removed by distillation under reduced pressure, and then a small amount of $CH_2Cl_2$ was added to the flask so that the remaining reaction mixture was dissolved, and after the solid was completely dissolved, n-hexane was added in an amount about 1.5 times larger than that of $CH_2Cl_2$. The reaction mixture was filtered through celite using n-hexane to remove white solid precipitate, thereby obtaining a light green filtrate. This green filtrate was dried under reduced pressure to obtain a dark green solid, followed by purification by silica column to obtain a green compound represented by Chemical Formula 7 in a yield of 75%:

[Chemical Formula 6-1]

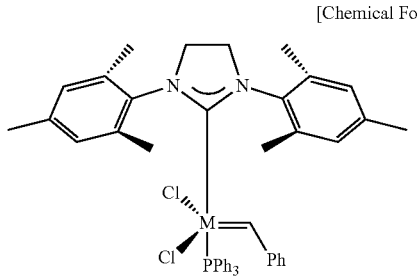

in Chemical Formula 6-1, M is ruthenium.

[Chemical Formula 7]

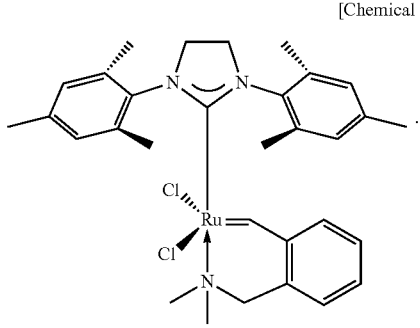

$^1$H NMR (CDCl$_3$, 500 MHz) δ 18.72 (s, 1H), 7.46 (broad s, 1H), 7.12 (broad s, 1H), 7.03 (broad s, 4H), 6.93 (broad s, 1H), 6.75 (broad s, 1H), 4.18 (broad s, 6H), 2.8-2.2 (18H), 1.94 (broad s, 6H).

Preparation Example 5

In a 500 ml flask, 17.3 g of a compound represented by Chemical Formula 4-9 below was placed in 200 ml of toluene, and stirred for 1 hour. After stirring, 20 g of the compound represented by Chemical Formula 6-1 was added to the stirred solution, and stirred at room temperature for 12 hours. When a color of the reaction solution in the flask was changed to blue-green, n-hexane was added to precipitate the compound. The precipitated compound was filtered and dried under reduced pressure to obtain a transition metal compound represented by Chemical Formula 3-9 below at a yield of 81% in which the compound represented by Chemical Formula 4-9 below was coordinated to ruthenium:

[Chemical Formula 4-9]

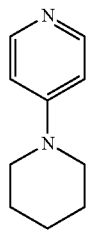

[Chemical Formula 6-1]

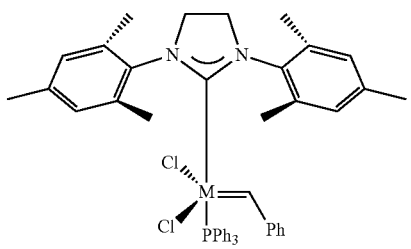

in Chemical Formula 6-1, M is ruthenium.

[Chemical Formula 3-9]

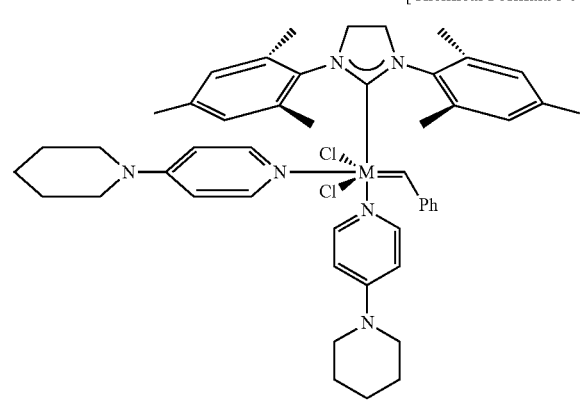

in Chemical Formula 3-9, M is ruthenium.

$^1$H NMR (CDCl$_3$, 500 MHz) δ 19.10 (s, 1H), 8.18 (d, 2H), 7.64 (d, 2H), 7.48 (t, 11H), 7.38 (d, 2H), 7.08 (t, 2H), 7.00

(broad s, 2H), 6.77 (broad s, 2H), 6.49 (d, 2H), 6.15 (d, 2H), 4.07 (broad d, 4H), 3.46 (t, 8H), 2.61-2.21 (18H), 1.5~1.50 (m, 12H).

Preparation Example 6

In a 500 ml flask, 200 ml of the compound represented by Chemical Formula 4-10 below and 20 g of the compound represented by Chemical Formula 6-1 below were added and stirred at room temperature for 1 hour. When a color of the reaction solution in the flask was changed from red to light green, cold n-hexane was added to precipitate the compound. The precipitated compound was filtered and dried under reduced pressure to obtain a transition metal compound represented by Chemical Formula 3-10 below at a yield of 80% in which the compound represented by Chemical Formula 4-10 below was coordinated to ruthenium:

[Chemical Formula 4-10]

[Chemical Formula 6-1]

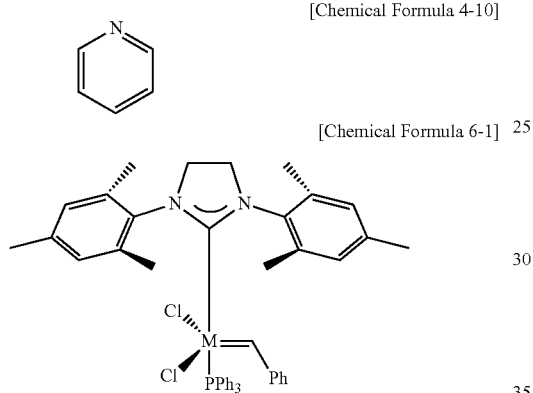

[Chemical Formula 3-10]

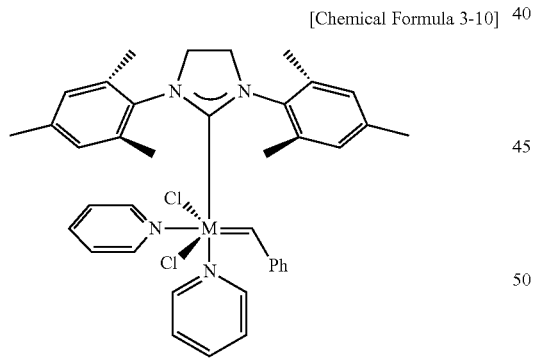

in Chemical Formula 3-10, M is ruthenium.

$^1$H NMR (CDCl$_3$, 500 MHz) δ 19.67 (s, 1H), 8.84 (broad s, 2H), 8.39 (broad s, 2H), 8.07 (broad s, 2H), 7.15 (t, 1H), 6.80-6.00 (broad multiple, 9H), 3.36 (broad d, 4H), 2.79 (s, 6H), 2.45 (s, 6H), 2.04 (s, 6H).

Preparation Example 7

In a 250 ml flask, 15 g of a compound represented by Chemical Formula 4-11 below was dissolved in 100 ml of toluene, and stirred for 1 hour. After stirring, 20 g of the compound represented by Chemical Formula 6-1 was added to the stirred solution, and stirred at room temperature for 12 hours. When a color of the reaction solution in the flask was changed from red to light green, n-hexane was added to precipitate the compound. The precipitated compound was filtered and dried under reduced pressure to obtain a transition metal compound represented by Chemical Formula 3-11 below at a yield of 83% in which the compound represented by Chemical Formula 4-11 below was coordinated to ruthenium:

[Chemical Formula 4-11]

[Chemical Formula 6-1]

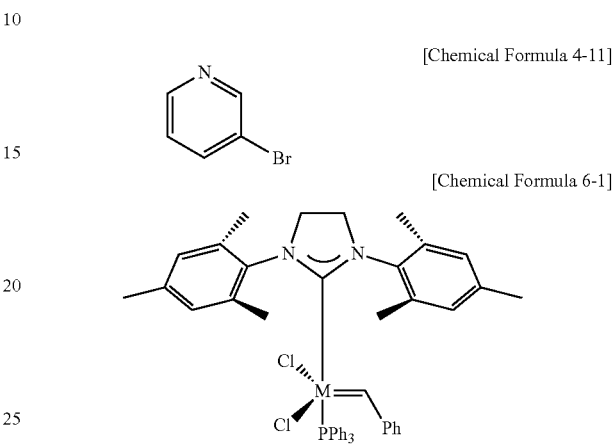

in Chemical Formula 6-1, M is ruthenium.

[Chemical Formula 3-11]

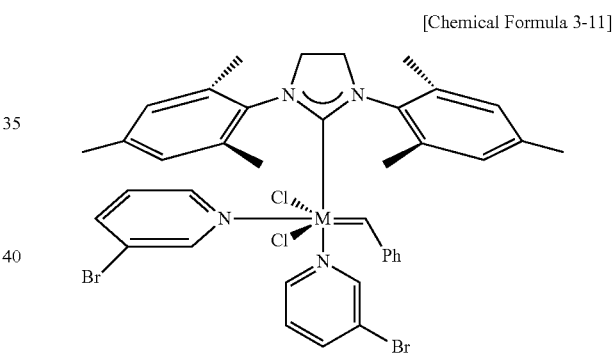

in Chemical Formula 3-11, M is ruthenium.

$^1$H NMR (CDCl$_3$, 500 MHz) δ 19.10 (s, 1H), 8.79 (broad s, 2H), 8.70 (broad s, 2H), 8.09 (broad s, 2H), 7.84 (broad s, 2H), 7.64 (broad s, 2H), 7.65 (d, 2H), 7,47 (t, 1H), 7.08 (t, 2H), 6.81 (broad s, 4H), 4.03 (broad d, 4H), 2.57 (s, 6H), 2.28 (s, 12H).

EXAMPLE

Example 1

20 g of polybutadiene rubber of which a molecular weight was not measureable since it was spontaneously cured and 100 g of n-hexane were added to three 250 ml Andrew glasses, respectively. In a glove box, 10 mg of the transition metal compound represented by the Chemical Formula 3-1 obtained in Preparation Example 1 was dissolved in 4.0 ml of toluene, and added together with 5.0 ml of the styrene monomer sequentially to each of the above-described Andrew glasses. Then, the Andrew glass was stirred in a thermostatic chamber at 70° C. for 3 hours, 6 hours and 24 hours, respectively. Then, the pressure in each Andrew glass was removed, and the solution in the Andrew glass was filtered through a mesh to recover the remaining rubber for each time period.

Example 2

Example 2 was performed in the same manner as in Example 1 except that the transition metal compound represented by Chemical Formula 3-7 obtained in Preparation Example 2 was added in the same equivalent amount instead of the transition metal compound represented by Chemical Formula 3-1 obtained in Preparation Example 1.

Example 3

Example 3 was performed in the same manner as in Example 1 except that the transition metal compound represented by Chemical Formula 3-8 obtained in Preparation Example 3 was added in the same equivalent amount instead of the transition metal compound represented by Chemical Formula 3-1 obtained in Preparation Example 1.

Example 4

Example 4 was performed in the same manner as in Example 1 except that 5 mg of the transition metal compound represented by Chemical Formula 3-1 and 5 mg of the transition metal compound represented by Chemical Formula 3-8 instead of 10 mg of the transition metal compound represented by Chemical Formula 3-1 obtained in Preparation Example 1 were dissolved in 4 ml of toluene and added to each Andrew glass.

Example 5

Example 5 was performed in the same manner as in Example 1 except that 5 mg of the transition metal compound represented by Chemical Formula 3-1 and 5 mg of the transition metal compound represented by Chemical Formula 3-8 instead of 10 mg of the transition metal compound represented by Chemical Formula 3-1 obtained in Preparation Example 1 were dissolved in 4 ml of toluene and added to each Andrew glass.

Example 6

Example 6 was performed in the same manner as in Example 1 except that 5 mg of the transition metal compound represented by Chemical Formula 3-7 and 5 mg of the transition metal compound represented by Chemical Formula 3-8 instead of 10 mg of the transition metal compound represented by Chemical Formula 3-1 obtained in Preparation Example 1 were dissolved in 4 ml of toluene and added to each Andrew glass.

Example 7

Example 7 was performed in the same manner as in Example 1 except that 3.3 mg of the transition metal compound represented by Chemical Formula 3-1, 3.3 mg of the transition metal compound represented by Chemical Formula 3-7, and 3.3 mg of the transition metal compound represented by Chemical Formula 3-8 instead of 10 mg of the transition metal compound represented by Chemical Formula 3-1 obtained in Preparation Example 1 were dissolved in 4 ml of toluene and added to each Andrew glass.

Example 8

Example 8 was performed in the same manner as in Example 1 except that 2.5 ml of styrene monomer and 2.5 ml of 1-hexene monomer were added instead of 5.0 ml of styrene monomer.

Example 9

Example 9 was performed in the same manner as in Example 1 except that 2.5 ml of styrene monomer and 2.5 ml of 1-octene monomer were added instead of 5.0 ml of styrene monomer.

Comparative Example 1

Comparative Example 1 was performed in the same manner as in Example 1 except that the transition metal compound represented by Chemical Formula 7 obtained in Preparation Example 4 was added in the same equivalent amount instead of the transition metal compound represented by Chemical Formula 3-1 obtained in Preparation Example 1.

Comparative Example 2

Comparative Example 2 was performed in the same manner as in Example 1 except that the transition metal compound represented by Chemical Formula 3-9 obtained in Preparation Example 5 was added in the same equivalent amount instead of the transition metal compound represented by Chemical Formula 3-1 obtained in Preparation Example 1.

Comparative Example 3

Comparative Example 3 was performed in the same manner as in Example 1 except that the transition metal compound represented by Chemical Formula 3-10 obtained in Preparation Example 6 was added in the same equivalent amount instead of the transition metal compound represented by Chemical Formula 3-1 obtained in Preparation Example 1.

Comparative Example 4

Comparative Example 4 was performed in the same manner as in Example 1 except that the transition metal compound represented by Chemical Formula 3-11 obtained in Preparation Example 7 was added in the same equivalent amount instead of the transition metal compound represented by Chemical Formula 3-1 obtained in Preparation Example 1.

Experimental Example

The rubbers that were filtered on the mesh for each time frame according to Examples 1 to 9 and Comparative Examples 1 to 4 were dried under reduced pressure at 80° C. for 12 hours using a conventional vacuum oven according to a dry weight measurement method, and then each weight of the dried rubber was measured using a general balance. Each weight relative to the polybutadiene rubber initially added was calculated by the following Equation 1, and indexed (shown as decomposition index) based on the amount of the rubber removed in Example 1 and shown in Tables 1 and 2 below. As the amount of removed rubber was larger, that is, the amount of rubber filtered by the mesh was smaller, the index was higher, which showed excellent removal efficiency.

Weight of removed rubber (g)=20g (weight of polybutadiene rubber initially added)−weight of dried rubber measured (g)　　　　[Equation 1]

Further, the weight average molecular weight of the oligomers remaining in the n-hexane solution were measured by performing gel permeation chromatography on the residues of the n-hexane solutions of Examples 2 and 3 and Comparative Example 1 in which the rubber was filtered and shown in the FIGURE below. Specifically, the gel permeation chromatography was used in combination with two PLgel Olexis (manufactured by Polymer Laboratories Ltd.) columns and one PLgel mixed-C (manufactured by Polymer Laboratories Ltd.) column. When the molecular weight was calculated, polystyrene (PS) was used as the GPC reference material.

Here, the weight average molecular weight graph of the FIGURE is a graph for showing whether or not an oligomer having a specific weight average molecular weight appearing on the x-axis is present as much as a value appearing on the y-axis.

Log Mw on the x-axis in the FIGURE means a weight average molecular weight, wherein the value of the x-axis is 2.0, indicating that the weight average molecular weight is 100 g/mol, the value of the x-axis is 3.0, indicating that the weight average molecular weight is 1,000 g/mol, the value of the x-axis is 4.0, indicating that the weight average molecular weight is 10,000 g/mol, and the value of the x-axis is 5.0, indicating that the weight average molecular weight is 100,000 g/mol.

The dwt/d (Log Mw) on the y-axis in the FIGURE means the number of oligomers showing the weight of the x-axis, wherein as the y-axis value is higher, the oligomers showing the weight of the x-axis are present in a large amount.

TABLE 1

| Classification | | Example | | | | | | | | |
|---|---|---|---|---|---|---|---|---|---|---|
| | | 1 | 2 | 3 | 4 | 5 | 6 | 7 | 8 | 9 |
| Amount of rubber removed after stirring for 3 hours | Index | 100 | 80 | 74 | 87 | 83 | 75 | 84 | 103 | 105 |
| Amount of rubber removed after stirring for 6 hours | Index | 100 | 95 | 92 | 103 | 96 | 93 | 95 | 105 | 109 |
| Amount of rubber removed after stirring for 24 hours | Index | 100 | 112 | 110 | 120 | 117 | 116 | 110 | 116 | 112 |

TABLE 2

| Classification | | Comparative Example | | | |
|---|---|---|---|---|---|
| | | 1 | 2 | 3 | 4 |
| Amount of rubber removed after stirring for 3 hours | Index | 60 | 62 | 29 | 15 |
| Amount of rubber removed after stirring for 6 hours | Index | 72 | 69 | 35 | 19 |
| Amount of rubber removed after stirring for 24 hours | Index | 88 | 76 | 42 | 25 |

As shown in Tables 1 and 2, when the cured rubber was decomposed into an oligomer using the cleaning liquid compositions of Examples 1 to 9 according to the present invention, it could be confirmed that the decomposition index was higher than those of Comparative Examples 1 to 4. In particular, upon comparing Comparative Examples 2 to 3, even if a similar pyridine derivative was coordinated to the ruthenium central metal, it could be confirmed that there was a very significant difference in the decomposition ability depending on the kind of substituent which was substituted on pyridine.

Further, in Examples 1, 8 and 9, even at the time of stirring for 3 hours and stirring for 6 hours, it could be confirmed that the amount of rubber removed was higher than those of Examples 2 to 7 as well as Comparative Examples, and thus a much larger amount of rubber was capable of being removed in a short period of time since an initial reaction rate was high.

Further, referring to the FIGURE showing weight average molecular weights of the oligomers remaining in the n-hexane solution measured by performing gel permeation chromatography on residues of the n-hexane solution of Examples 2 and 3 and Comparative Example 1, when the cured rubber was decomposed into oligomers using the cleaning liquid compositions of Examples 2 and 3, as compared to when the cured rubber was decomposed into oligomers using the cleaning liquid composition of Comparative Example 1, relatively low molecular weight oligomers were present in a large amount to exhibit a high decomposition index, and simultaneously, as compared to Comparative Example 1 in which the decomposed oligomers remaining in the solution had a weight average molecular weight of tens of thousands of units (g/mol) (Log Mw 4.0 to 5.0), Examples 2 and 3 had an average molecular weight in about hundreds of units (g/mol) (Log Mw 2.0 to 3.0) such as 210, 308, 407, 507 and 608 g/mol, and the like, thus exhibiting excellent decomposition ability that is capable of being decomposed into oligomers having a much lower weight average molecular weight, and thus it was possible to perform cleaning more easily when the polymerization apparatus was cleaned.

In other words, from the above shown results, the present inventors found that when the polymerization apparatus was cleaned using the cleaning liquid composition according to the present invention, the high molecular weight polymer accumulated in the polymerization apparatus could be removed in a chemical manner, and thus it was possible to perform cleaning within a short period of time without causing a problem of safety due to direct supply with manpower, thereby shortening re-operation time of the polymerization reactor to improve productivity.

The invention claimed is:

1. A cleaning liquid composition comprising:
   a transition metal compound represented by Chemical Formula 1 below; and
   a hydrocarbon-based solvent, wherein the hydrocarbon-based solvent is an aliphatic hydrocarbon solvent, an aromatic hydrocarbon solvent or a combination thereof:

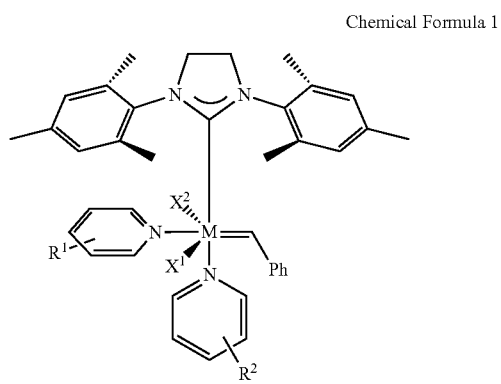

Chemical Formula 1 in Chemical Formula 1,
M is ruthenium or osmium, $R^1$ and $R^2$ are each independently a hydrogen atom or a substituent represented by Chemical Formula 2 below, at least one of $R^1$ or $R^2$ is a substituent represented by Chemical Formula 2 below, $X^1$ and $X^2$ are each independently a halogen atom, and Ph is a phenyl group,

Chemical Formula 2 in Chemical Formula 2,
$R^3$ and $R^4$ are each independently a C1-C10 alkyl group; or $R^3$ and $R^4$ are linked with each other to form a saturated or unsaturated 5-membered ring,
wherein the cleaning liquid composition comprises at least one first aromatic vinyl-based monomer and at least one or more vinyl-based monomers selected from the group consisting of a C2-C10 olefin monomer, a conjugated diene-based monomer, and a second aromatic vinyl-based monomer.

2. The cleaning liquid composition of claim 1, wherein
   M is ruthenium or osmium, $R^1$ and $R^2$ are each independently the substituent represented by Chemical Formula 2, and $X^1$ and $X^2$ are Cl or Br, and
   $R^3$ and $R^4$ are each independently a C1-C5 alkyl group; or $R^3$ and $R^4$ are linked with each other to form a saturated or unsaturated 5-membered ring.

3. The cleaning liquid composition of claim 1, wherein
   M is ruthenium, $R^1$ and $R^2$ are each independently the substituent represented by Chemical Formula 2, and $X^1$ and $X^2$ are Cl, and
   $R^3$ and $R^4$ are linked with each other to form a saturated or unsaturated 5-membered ring.

4. The cleaning liquid composition of claim 1, wherein the transition metal compound represented by Chemical Formula 1 is a transition metal compound represented by Chemical Formula 3 below:

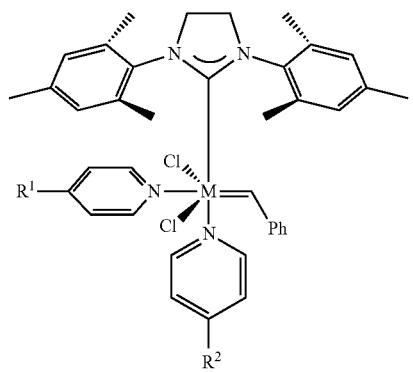

Chemical Formula 3 in Chemical Formula 3,
M is ruthenium or osmium, $R^1$ and $R^2$ are each independently a hydrogen atom or a substituent represented by Chemical Formula 2 below, at least one of $R^1$ or $R^2$ is a substituent represented by Chemical Formula 2 below, and Ph is a phenyl group,

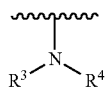

Chemical Formula 2 in Chemical Formula 2,
$R^3$ and $R^4$ are each independently a C1-C10 alkyl group; or $R^3$ and $R^4$ are linked with each other to form a saturated or unsaturated 5-membered ring.

5. The cleaning liquid composition of claim 4, wherein the transition metal compound represented by Chemical Formula 3 is one of transition metal compounds represented by Chemical Formulas 3-1 to 3-8 below:

Chemical Formula 3-1
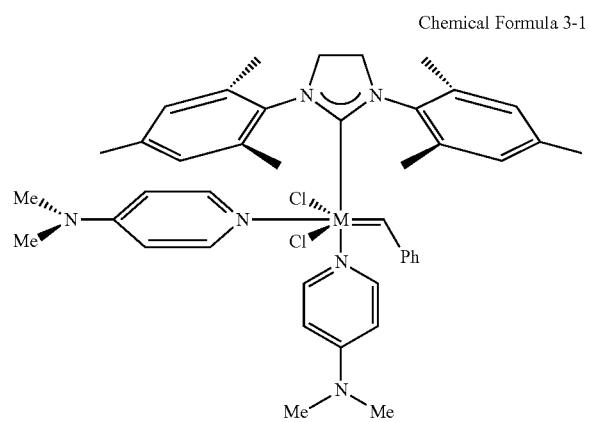
Chemical Formula 3-5
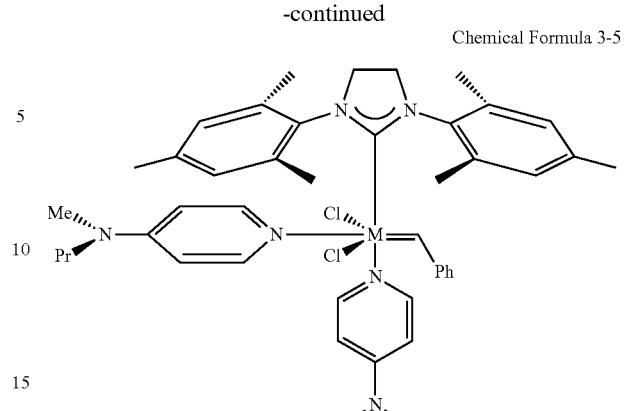
Chemical Formula 3-2
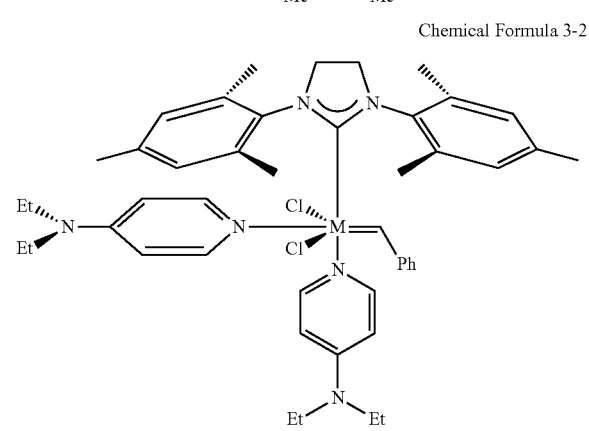
Chemical Formula 3-6
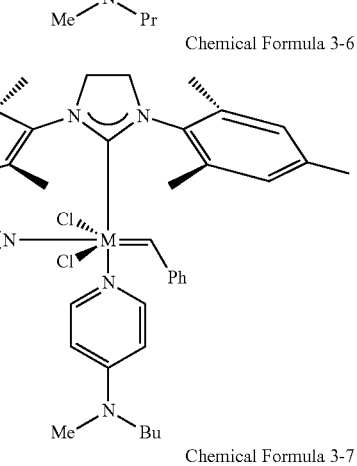
Chemical Formula 3-3
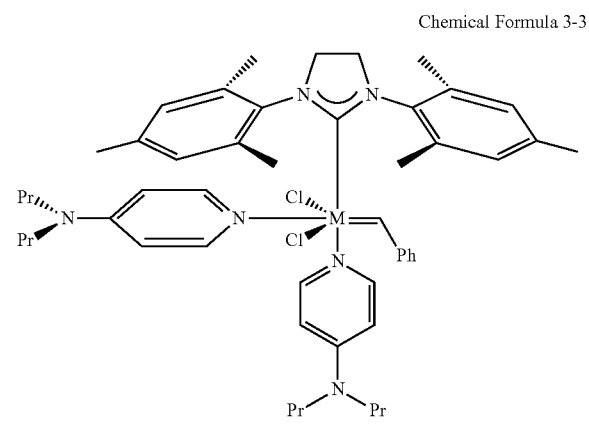
Chemical Formula 3-7
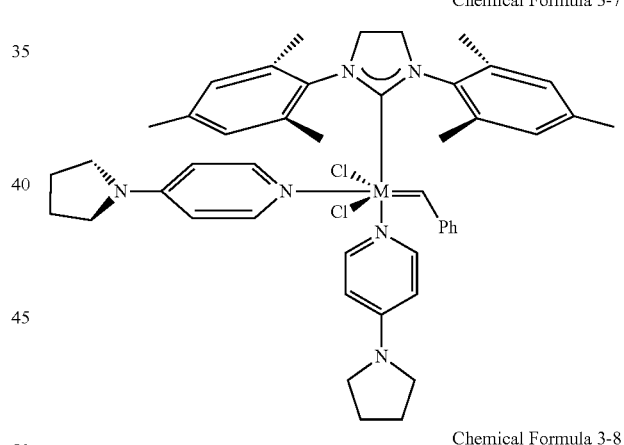
Chemical Formula 3-4
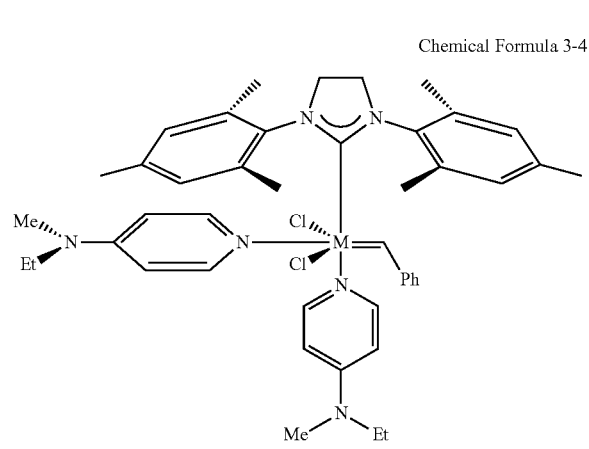
Chemical Formula 3-8
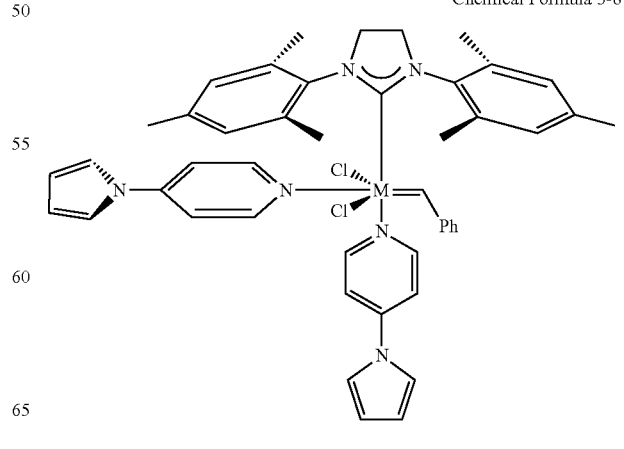

in Chemical Formulas 3-1 to 3-8,

M is ruthenium, Ph is a phenyl group, Me is a methyl group, Et is an ethyl group, Pr is a propyl group, and Bu is a butyl group.

6. The cleaning liquid composition of claim 1, wherein the cleaning liquid composition includes two or more of the transition metal compounds represented by Chemical Formula 1.

7. The cleaning liquid composition of claim 1, wherein the hydrocarbon-based solvent is an aromatic hydrocarbon solvent.

8. The cleaning liquid composition of claim 1, wherein an amount of the transition metal compound represented by Chemical Formula 1 is 0.1% by weight to 10% by weight based on a total amount of the cleaning liquid composition.

9. A cleaning method of a polymerization apparatus comprising:
   swelling a diene-based polymer in a polymerization apparatus with a hydrocarbon-based solvent; and
   adding and stirring the cleaning liquid composition of claim 1 in the presence of the diene-based polymer), thereby oligomerizing the diene-based polymer.

10. The cleaning method of claim 9, wherein the diene-based polymer is one selected from the group consisting of a butadiene rubber, an isoprene rubber, a styrene-butadiene rubber, and a styrene-butadiene-styrene block copolymer.

11. The cleaning method of claim 9, wherein the swelling is performed at 50° C. to 100° C.

12. The cleaning method of claim 9, wherein the stirring is performed for 1 to 24 hours.

\* \* \* \* \*